(12) United States Patent
Kahn

(10) Patent No.: US 8,583,922 B2
(45) Date of Patent: Nov. 12, 2013

(54) HIDDEN IDENTIFICATION

(75) Inventor: Raynold M. Kahn, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 950 days.

(21) Appl. No.: 11/862,101

(22) Filed: Sep. 26, 2007

(65) Prior Publication Data
US 2008/0016349 A1    Jan. 17, 2008

Related U.S. Application Data

(63) Continuation-in-part of application No. 10/085,346, filed on Feb. 28, 2002, now Pat. No. 7,457,967.

(51) Int. Cl.
*H04L 29/06* (2006.01)

(52) U.S. Cl.
USPC ............. 713/168; 713/163; 713/193; 725/25; 725/63; 726/26; 726/27

(58) Field of Classification Search
USPC ......... 713/163, 168, 193; 725/25, 63; 726/26, 726/27
See application file for complete search history.

(56) References Cited

U.S. PATENT DOCUMENTS

| | | | |
|---|---|---|---|
| 4,580,161 A | 4/1986 | Petrus et al. | |
| 4,586,162 A | 4/1986 | Murai | |
| 4,748,668 A * | 5/1988 | Shamir et al. | 380/30 |
| 4,792,972 A | 12/1988 | Cook, Jr. | |
| 4,890,319 A | 12/1989 | Seth-Smith et al. | |
| 4,908,834 A | 3/1990 | Wiedemer | |
| 5,222,141 A | 6/1993 | Killian | |
| 5,237,610 A | 8/1993 | Gammie et al. | |
| 5,282,249 A | 1/1994 | Cohen et al. | |
| 5,331,412 A | 7/1994 | Farmer et al. | |
| 5,393,982 A * | 2/1995 | Mott et al. | 250/370.06 |
| 5,781,226 A | 7/1998 | Sheehan | |
| 5,867,644 A | 2/1999 | Ranson et al. | |

(Continued)

FOREIGN PATENT DOCUMENTS

| | | |
|---|---|---|
| EP | 0851358 | 7/1998 |
| EP | 0971361 | 1/2000 |

(Continued)

OTHER PUBLICATIONS

Notice of Allowance dated Sep. 2, 2008 in U.S. Appl. No. 10/085,331, filed Feb. 28, 2002 by Ronald P. Cocchi et al.

(Continued)

*Primary Examiner* — Nathan Flynn
*Assistant Examiner* — Sarah Su

(57) ABSTRACT

A method, apparatus, and article of manufacture limit unauthorized access to digital services. A hidden non-modifiable identification number is embedded into a nonvolatile memory component. The hidden number uniquely identifies a device containing the nonvolatile memory component and access to digital services is based on rights associated with the hidden number. Access to the nonvolatile memory is isolated such that access to the identification number is limited to a fixed state custom logic block. The custom logic block has hardware configured to use the hidden number and other information to provide an output that is a function of the hidden number and that can be used to confirm an identity of a device without revealing information that can be used to impersonate the device.

27 Claims, 10 Drawing Sheets

(56) References Cited

U.S. PATENT DOCUMENTS

| | | | |
|---|---|---|---|
| 5,886,730 | A | 3/1999 | Tsosie |
| 6,026,020 | A | 2/2000 | Matsubara et al. |
| 6,035,037 | A | 3/2000 | Chaney |
| 6,035,038 | A | 3/2000 | Campinos et al. |
| 6,069,647 | A | 5/2000 | Sullivan et al. |
| 6,154,819 | A | 11/2000 | Larsen et al. |
| 6,157,719 | A | 12/2000 | Wasilewski et al. |
| 6,230,244 | B1 | 5/2001 | Kai |
| 6,240,495 | B1 | 5/2001 | Usui |
| 6,278,633 | B1 | 8/2001 | Wong et al. |
| 6,289,455 | B1 | 9/2001 | Kocher et al. |
| 6,334,216 | B1 | 12/2001 | Barth |
| 6,853,385 | B1 | 2/2005 | MacInnis et al. |
| 7,119,662 | B1* | 10/2006 | Horiguchi et al. ............ 340/5.7 |
| 7,444,368 | B1* | 10/2008 | Wong et al. ................... 709/200 |
| 2002/0073428 | A1 | 6/2002 | Gurevich et al. |
| 2002/0126844 | A1* | 9/2002 | Rix et al. ...................... 380/211 |
| 2002/0145931 | A1 | 10/2002 | Pitts |
| 2003/0023512 | A1* | 1/2003 | Festa et al. ...................... 705/27 |
| 2003/0046213 | A1* | 3/2003 | Vora et al. ........................ 705/36 |
| 2003/0046686 | A1 | 3/2003 | Candelore et al. |
| 2003/0158960 | A1* | 8/2003 | Engberg ........................ 709/237 |
| 2004/0016002 | A1 | 1/2004 | Handelman et al. |
| 2004/0123156 | A1* | 6/2004 | Hammond et al. ........... 713/201 |
| 2005/0066355 | A1* | 3/2005 | Cromer et al. .................. 725/31 |
| 2005/0289585 | A1* | 12/2005 | Pedlow et al. ................... 725/29 |
| 2006/0271794 | A1* | 11/2006 | Nonaka et al. ................. 713/193 |
| 2007/0192628 | A1* | 8/2007 | Stone et al. .................... 713/193 |

FOREIGN PATENT DOCUMENTS

| | | |
|---|---|---|
| EP | 0984403 | 3/2000 |
| EP | 1050821 | 11/2000 |
| EP | 1074906 | 2/2001 |
| EP | 1085516 | 3/2001 |
| EP | 1176826 | 1/2002 |
| WO | WO 00/77717 | 12/2000 |
| WO | WO 02/093332 | 11/2002 |

OTHER PUBLICATIONS

Non-final Office Action dated Feb. 21, 2008 in U.S. Appl. No. 10/085,331, filed Feb. 28, 2002 by Ronald P. Cocchi et al.
Advisory Action dated Oct. 10, 2007 in U.S. Appl. No. 10/085,331, filed Feb. 28, 2002 by Ronald P. Cocchi et al.
Final Rejection dated Jul. 17, 2007 in U.S. Appl. No. 10/085,331, filed Feb. 28, 2002 by Ronald P. Cocchi et al.
Non-final Office Action dated Jan. 19, 2007 in U.S. Appl. No. 10/085,331, filed Feb. 28, 2002 by Ronald P. Cocchi et al.
Advisory Action dated Dec. 8, 2006 in U.S. Appl. No. 10/085,331, filed Feb. 28, 2002 by Ronald P. Cocchi et al.
Final Rejection dated Sep. 19, 2006 in U.S. Appl. No. 10/085,331, filed Feb. 28, 2002 by Ronald P. Cocchi et al.
Non-final Office Action dated Dec. 13, 2006 in U.S. Appl. No. 10/085,331, filed Feb. 28, 2002 by Ronald P. Cocchi et al.
EPO Communication dated Jul. 12, 2004 in European counterpart Application No. 03 004 322.8 of U.S. Appl. No. 10/085,331, filed Feb. 28, 2002 by Ronald P. Cocchi et al.
Israel Office Action dated Aug. 24, 2006 in Israel counterpart Application No. 154,657 of U.S. Appl. No. 10/085,331, filed Feb. 28, 2002 by Ronald P. Cocchi et al.
Notice of Allowance dated May 17, 2007 in U.S. Appl. No. 10/085,860, filed Feb. 28, 2002 by Ronald P. Cocchi et al.
Notice of Panel Decision from Pre-Appeal Brief Review dated Dec. 11, 2006 in U.S. Appl. No. 10/085,860, filed Feb. 28, 2002 by Ronald P. Cocchi et al.
Advisory Action dated Oct. 27, 2006 in U.S. Appl. No. 10/085,860, filed Feb. 28, 2002 by Ronald P. Cocchi et al.
Final Rejection dated Aug. 15, 2006 in U.S. Appl. No. 10/085,860, filed Feb. 28, 2002 by Ronald P. Cocchi et al.
Non-final Office Action dated Mar. 30, 2006 in U.S. Appl. No. 10/085,860, filed Feb. 28, 2002 by Ronald P. Cocchi et al.
Non-final Office Action dated Oct. 18, 2005 in U.S. Appl. No. 10/085,860, filed Feb. 28, 2002 by Ronald P. Cocchi et al.
EPO Communication dated Jul. 12, 2004 in European counterpart Application No. 03 004 320.2 of U.S. Appl. No. 10/085,860, filed Feb. 28, 2002 by Ronald P. Cocchi et al.
Israel Office Action dated Dec. 31, 2007 in Israel counterpart Application No. 154,659 of U.S. Appl. No. 10/085,860, filed Feb. 28, 2002 by Ronald P. Cocchi et al.
Final Rejection dated Jun. 28, 2007 in U.S. Appl. No. 10/085,920, filed Feb. 28, 2002 by Ronald P. Cocchi et al.
Non-final Office Action dated Jan. 19, 2007 in U.S. Appl. No. 10/085,920, filed Feb. 28, 2002 by Ronald P. Cocchi et al.
Advisory Action dated Nov. 21, 2006 in U.S. Appl. No. 10/085,920, filed Feb. 28, 2002 by Ronald P. Cocchi et al.
Final Rejection dated Sep. 6, 2006 in U.S. Appl. No. 10/085,920, filed Feb. 28, 2002 by Ronald P. Cocchi et al.
Non-final Office Action dated Dec. 13, 2005 in U.S. Appl. No. 10/085,920, filed Feb. 28, 2002 by Ronald P. Cocchi et al.
EPO Communication dated Aug. 2, 2004 in European counterpart Application No. 03 004 321.0 of U.S. Appl. No. 10/085,920, filed Feb. 28, 2002 by Ronald P. Cocchi et al.
Israel Office Action dated Aug. 24, 2006 in Israel counterpart Application No. 154,658 of U.S. Appl. No. 10/085,920, filed Feb. 28, 2002 by Ronald P. Cocchi et al.
Translated Israel Office action dated Jan. 19, 2011 in Israel Patent Application No. 154656 filed Feb. 27, 2003 by Raynold M. Kahn et al.
EBU Project Group B/CA; "Functional Model of a Conditional Access System"; EBU Review Technical; European Broadcasting Union; Brussels, Belgium; No. 266; Dec. 21, 1995; pp. 64-77; XP 000559450.
Notice of Allowance dated Feb. 5, 2008 in U.S. Appl. No. 10/085,346, filed Feb. 28, 2002 by Ronald P. Cocchi et al.
Notice of Allowance dated Jan. 8, 2008 in U.S. Appl. No. 10/085,920, filed Feb. 28, 2002 by Ronald P. Cocchi et al.
Microsoft Computer Dictionary, 5th Edition, p. 353, 2002.
Khouri, Osama et al.; "Low Output Resistance Charge Pump for Flash Memory Programming"; IEEE International Workshop on Memory Technology, Design and Testing; MTDT 2001; San Jose, California, USA; XP-002257688.
Araki, Shigeo; "The Memory Stick"; IEEE Micro; ISSN: 0272.1732; vol. 20, No. 4; Jul.-Aug. 2000; pp. 40-46; XP-002257044.
Robin, Michael et al.; "Digital Television Fundamentals-Design and Installation of Video and Audio Systems"; McGraw-Hill; Chapter 8; title page and pp. 345-425, 1997.

* cited by examiner

HIDDEN IDENTIFICATION

CROSS-REFERENCE TO RELATED APPLICATIONS

This application is a continuation-in-part and claims the benefit under 35 U.S.C. Section 120 of the following co-pending and commonly-assigned U.S. utility patent application(s), which is/are incorporated by reference herein:
U.S. patent application Ser. No. 10/085,346, entitled "HIDDEN IDENTIFICATION", by Ronald P. Cocchi, Christopher P. Curren, and Raynold M. Kahn, filed on Feb. 28, 2002.

This application is related to the following co-pending and commonly-assigned patent applications, which applications are incorporated by reference herein:
U.S. patent application Ser. No. 10/085,331, entitled "MULTIPLE NONVOLATILE MEMORIES", by Ronald Cocchi, et. al., filed on Feb. 28, 2002;
U.S. patent application Ser. No. 10/085,920, entitled "DEDICATED NONVOLATILE MEMORY", by Ronald Cocchi, et. al., filed on Feb. 28, 2002; and
U.S. patent application Ser. No. 10/085,860, entitled "ASYNCHRONOUS CONFIGURATION", by Ronald Cocchi, et. al., filed on Feb. 28, 2002.

BACKGROUND OF THE INVENTION

1. Field of the Invention

The present invention relates to systems and methods for preventing/limiting unauthorized access to digital services and in particular to a method and system for uniquely identifying nonvolatile memory such that the identity of the memory is hidden.

2. Description of the Related Art

Digital services such as television programs and information regarding those programs (e.g., a program guide) are distributed to users by a variety of broadcasting methods. Such services may be proprietary and available on a subscription basis. To prevent unauthorized access to the services, a plethora of security mechanisms are utilized. Such mechanisms may store information in memory, wherein the information is used to validate a user or provide access. However, persons often attempt to obtain illegal/unauthorized access to the services by altering or accessing the memory contents. What is needed is the capability to prevent or increase the difficulty of obtaining illegal access to the information and digital services. These problems may be better understood by a description of current broadcasting methods, security mechanisms, and methods for obtaining unauthorized access to such services.

As described above, television programs and digital services are distributed to viewers by a variety of broadcasting methods. These methods include traditional analog broadcast television (National Television Systems Committee or "NTSC" standard), the soon to be required digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium.

To view the television programming and have access to the digital services, users commonly have a set top box (also referred to as an integrated receiver/decoder [IRD]). Within the system or set top box, a security component/microcircuit known as a smart card may be utilized to prevent unauthorized access to the television programs and digital services. The smart card microcircuit may contain a microprocessor, volatile memory components, nonvolatile memory components, and a system input/output module.

Nonvolatile memory has been used extensively throughout the electronics industry. For example, in the IRD, the microprocessor utilizes nonvolatile memory to contain state information (e.g., status information) used to provide the desired functionality and enforce security policies intended by the designers. The microprocessor and/or a memory access control unit utilized by the microprocessor restricts access to the memory components.

However, there have been numerous attempts by individuals or companies (i.e., hackers or attackers) to attack, misuse, or modify the nonvolatile memory through external means of reprogramming or otherwise altering the contents of the memory when the memory component has been available to the central processor or otherwise on the system bus. For example, attacks using unforeseen methods or subverting poorly implemented defenses can be used to gain unauthorized access to the contents of the memory and/or lead to reprogramming the contents of the memory. Reprogramming or unauthorized access to the memory contents can lead to complete compromise of the security features intended in the device.

The simplest and most prevalent form of attack against the memory components uses external noninvasive means using a system's input/output module due to the low cost of the equipment required to implement this form of attack. Most attacks occur by inappropriate manipulation of a microprocessor or memory access control unit. For example, memory contents have been subverted when a memory access control unit (that controls access to a memory component) has been compromised. Once the single memory component has been breached, the attacker may then have the capability to access all memory address locations that reside in other memory components.

An example of unauthorized access to digital services occurs when a smart card or memory component is cloned. In such a low cost cloning attack, the identity of a card is copied to a new card. Accordingly, smart cards/memory components have an unchangeable identity/identification number. In the prior art, the identification number may be established as a hardwired identification number in read only memory (ROM). However, using a new ROM mask with a hardwired identification number for each chip produced is expensive and time consuming. Further, identification numbers in the prior art are accessible to the system input/output module, system bus, microprocessor, or external environment, thereby allowing attacks to the system.

In the prior art, the smart card identification number may be used by the IRD to allow or deny access to digital services, for example rejecting the card if the number falls outside the normal range of numbers used by the broadcaster. Similarly, the card may be rejected if the number appears in a blacklist message received by the IRD, identifying card numbers no longer in use, or cards whose service has been terminated, or card numbers known to be used by pirate devices. Alternately, the card may be rejected if the number does not appear in a received list of valid cards. Alternately, a pairing message may be received from the broadcaster, or entered by the subscriber, identifying a single card number authorized for use in that specific IRD, so that any other card is rejected. In order to apply the operations in these examples, the card identification number must be read by the IRD, using an input-output operation between the card and IRD. Since this identification number is observable, it may be copied and used by pirate devices to obtain similar access rights as the original.

Such an attack is particularly damaging if the identification number can be copied from one card to other cards originally manufactured and distributed by the service provider, since this not only causes losses due to the pirating of services, but also the loss of use and potential revenue from the other cards. One method to deter such a cloning attack is to store the identification number in a manner that may be read but may not be modified. Earlier embodiments in the prior art were easily circumvented by internal and external attacks including inappropriate manipulation of a microprocessor or memory access control unit. The current invention improves on such embodiments by storing the identification number in a separate and protected non-volatile memory.

While write-protected storage may prevent the pirate from copying the identifier into the service provider cards, it does not prevent the pirate from manufacturing other devices that use an identification number that has been copied from a valid card, or obtained by intercepting the input-output between a valid card and IRD, or by randomly generating potential card numbers and using trial and error until a number succeeds.

In the prior art, such attacks have been limited by additional hidden identification numbers that protect and/or validate the observable card identification number. For example, a zero knowledge identification procedure allows the IRD to validate the observable card number by checking card responses that are based on a different but related hidden number. In another example, a public-key digital signature algorithm allows the IRD to validate the observable card number by checking the digital signature from the card that is based on additional hidden information. In these and many other similar examples, the IRD (or a server, in the case of service requests from the IRD or card to the server by broadband or a dial-up back-channel) is able to validate the observable card identification number (or other information or requests from the card) by checking whether or not the card output data is consistent with internal card procedures or algorithms operating on hidden card identification numbers, and thereby the IRD (or server) may deny service for invalidated cards that fail to satisfy this proof of identity.

In the prior art, the hidden identification numbers are commonly stored in non-volatile memory directly accessible for reading or writing by the internal microprocessor, which performs the identification procedures and algorithms in software. In these embodiments, the hidden information is assumed to be protected because the system input-output is not designed with specific commands to read or change this data. However, pirates have frequently succeeded in cloning attacks on such systems by reading the hidden information using external noninvasive attacks on the volatile or non-volatile memory components by inappropriate manipulation of a microprocessor or memory access control unit. The current invention improves upon such embodiments by storing the hidden identification number in a separate and protected non-volatile memory that cannot be read or altered by the microprocessor, and using a custom logic block to perform identification procedures.

In the prior art methods have been taught for the storing of device keys in protected memory, where these hidden keys are used to produce the content decryption keys required for decrypting and thereby gaining access to digital content. However, such prior art does not disclose the storage of hidden identification numbers in protected memory, where these hidden identification numbers are used to identify devices that are permitted access to digital content as well as other services or systems.

SUMMARY OF THE INVENTION

Digital services systems often contain a service module known as a smart card to prevent unauthorized access to the services. The smart card microcircuit contains a microprocessor, volatile memory components, nonvolatile memory components, a custom logic block, and a system input/output module. The security system may be compromised if memory components are used or attacked in unintended ways.

One or more embodiments of the invention provide a method, apparatus, and article of manufacture for incorporating a hidden identification number into some form of non-volatile memory. The identification number is hidden from the microprocessor by placing the number in a memory location that is not accessible by the system input/output module, system bus, microprocessor, or external environment. The nonvolatile memory is read or operated on only through a custom logic block. The hidden identification number is protected because it is not accessible by the microprocessor and hence cannot be read or altered by external means. Further, the hidden identification number uniquely identifies the device that contains the nonvolatile memory and is associated with and used to determine access rights/privileges to digital content and other services or systems.

In one embodiment the identification number may be stored in a separate and protected non-volatile memory, using a custom logic block which allows the identification number to be read by the microprocessor, but which prevents modification of the identification number, thereby protecting against cloning attacks where the identification number is copied into a different card originally manufactured and distributed by the service provider.

In another embodiment, additional hidden identification numbers may be stored in a separate and protected non-volatile memory that cannot be read or altered by the microprocessor, but using a custom logic block to perform identification procedures or algorithms that use the hidden identification numbers to validate the observable identification number, thereby protecting against cloning attacks where the identification number is copied or observed or generated for use by pirate devices or systems.

The present invention has wider application than only providing access control for digital content, but is more generally applicable for controlling access to any services or systems, using a smart card or similar device to establish the identity and rights of the user, and thereby to allow the use of systems and functions (e.g. game consoles or software or stored content) or even to allow physical access (e.g. electronic safe locks or door locks to restricted areas).

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description reference is made to the accompanying drawings which form a part hereof and which show, by way of illustration, several embodiments of the present invention. It is understood that other embodiments may be utilized and structural changes may be made without departing from the scope of the present invention.

Overview

A non-modifiable protected/hidden identification number is embedded into a nonvolatile memory component. The hidden identification number is not accessible through a system input/output module, system bus, microprocessor, or external environment. The hidden identification is programmed after manufacturing and makes the nonvolatile memory component (and thereby the chip containing the memory component) unique.

Video Distribution System

Figure 1:
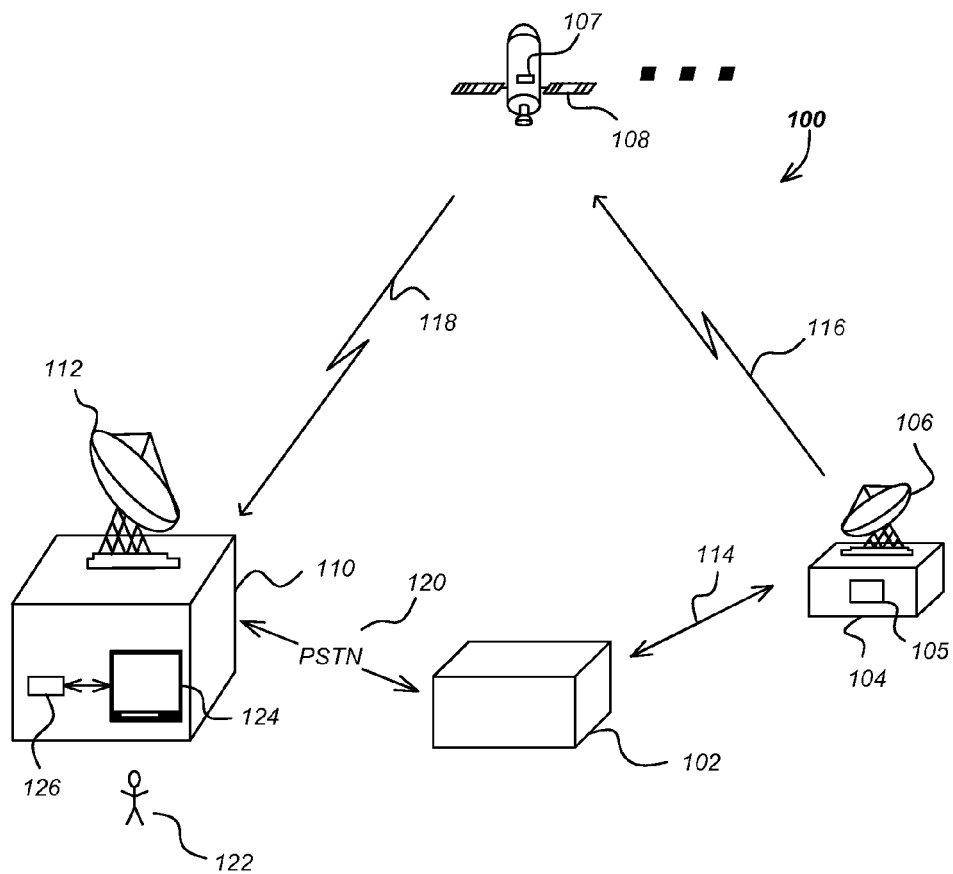
FIG. 1 is a diagram showing an overview of a video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. digital services, video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108 via uplink 116. The satellite receives and processes this information, and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

The subscriber receiving station 110 permits the use/viewing of the information by a subscriber 122. For example, the information may be used/viewed on a television 124 or other display device. To control access to the information, the subscriber receiving station 110 includes an integrated receiver/decoder (IRD) 126. In embodiments of the invention, the IRD 126 is communicatively coupled to a security component known as a conditional access module or smart card that controls access to the information/digital services.

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques to enhance the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

Uplink Configuration

Figure 2:
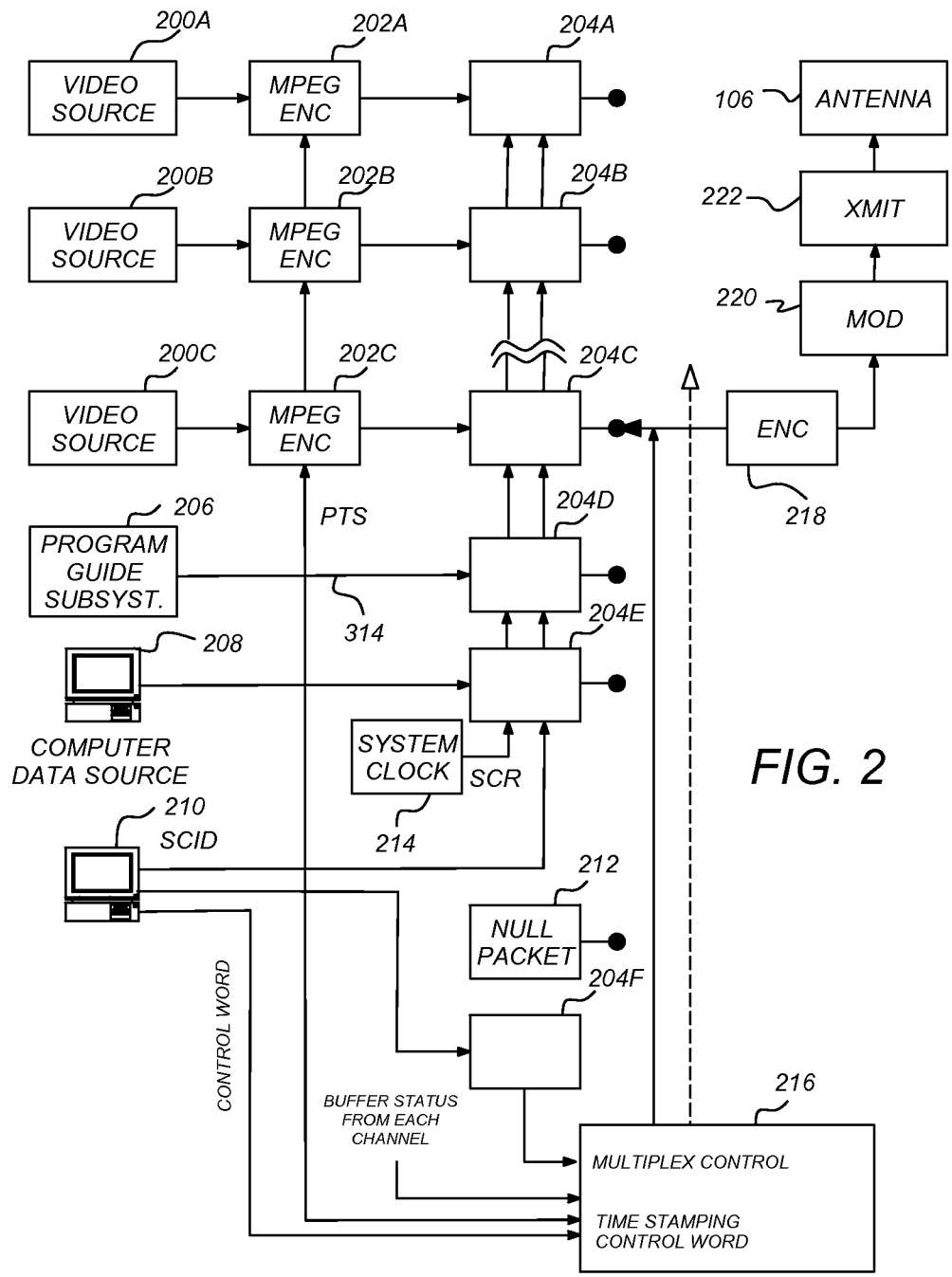
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), a data channel from a program guide subsystem 206 and computer data information from a computer data source 208.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) that may be associated with each source 200.

The data packets are assembled using a reference from the system clock 214 (SCR), and from the conditional access manager 210, which provides the SCID to the packetizers 204 for use in generating the data packets. These data packets are then multiplexed into serial data and transmitted.

Program Guide Subsystem

Figure 3:
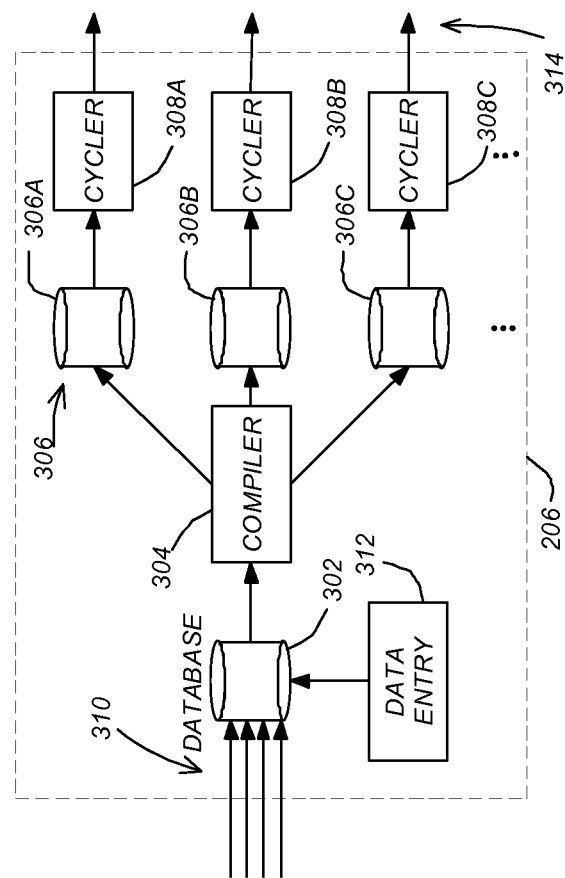
FIG. 3 is a block diagram of one embodiment of the program guide subsystem.

FIG. 3 is a block diagram of one embodiment of the program guide subsystem 206. The program guide data transmitting system 206 includes program guide database 302, compiler 304, sub-databases 306A-306C (collectively referred to as sub-databases 306) and cyclers 308A-308C (collectively referred to as cyclers 308).

Schedule feeds 310 provide electronic schedule information about the timing and content of various television channels, such as that found in television schedules contained in newspapers and television guides. Schedule feeds 310 preferably include information from one or more companies that specialize in providing schedule information, such as TRIBUNE MEDIA SERVICES™, and T.V. DATA™. The data provided by companies such as TRIBUNE MEDIA SERVICES™ and T.V. DATA™ are typically transmitted over telephone lines to program guide database 302. These companies provide television schedule data for all of the television stations across the nation plus the nationwide channels, such as SHOWTIME™, HBO™, and the DISNEY CHANNEL™. The specific format of the data that are provided by these companies varies from company to company. Program guide database 302 preferably includes schedule data for television channels across the entire nation including all nationwide channels and local channels, regardless of whether the channels are transmitted by the transmission station.

Program guide database 302 is a computer-based system that receives data from schedule feeds 310 and organizes the data into a standard format. Compiler 304 reads the standard form data out of program guide database 302, identifies common schedule portions, converts the program guide data into the proper format for transmission to users (specifically, the program guide data are converted into objects as discussed below) and outputs the program guide data to one or more of sub-databases 306.

Program guide data can also be manually entered into program guide database 302 through data entry station 312. Data entry station 312 allows an operator to enter additional scheduling information, as well as combining and organizing data supplied by the scheduling companies. As with the computer organized data, the manually entered data are converted by the compiler into separate objects and sent to one or more of sub-databases 306.

The program guide objects are temporarily stored in sub-databases 306 until cyclers 308 request the information. Each of cyclers 308 may transmit objects at a different rate than the other cyclers 308. For example, cycler 308A may transmit objects every second, while cyclers 308B and 308C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 308 with a high rate of transmission, while program guide objects for later programs are sent to cyclers 308 with a lower rate of transmission. One or more of the data outputs 314 of the cyclers 308 are forwarded to the packetizer of a particular transponder, as depicted in FIG. 2.

It is noted that the uplink configuration depicted in FIG. 2 and the program guide subsystem depicted in FIG. 3 can be implemented by one or more hardware modules, one or more software modules defining instructions performed by a processor, or a combination of both.

Broadcast Data Stream Format and Protocol

Figure 4A:
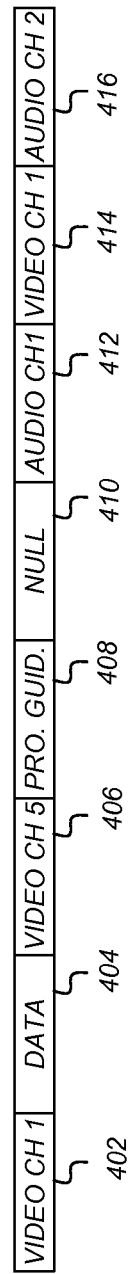
FIG. 4A is a diagram of a representative data stream received from a satellite.

FIG. 4A is a diagram of a representative data stream. The first packet segment 402 comprises information from video channel 1 (data coming from, for example, the first video program source 200A). The next packet segment 404 comprises computer data information that was obtained, for example from the computer data source 208. The next packet segment 406 comprises information from video channel 5 (from one of the video program sources 200). The next packet segment 408 comprises program guide information such as the information provided by the program guide subsystem 206. As shown in FIG. 4A, null packets 410 created by the null packet module 212 may be inserted into the data stream as desired. The following packet segments 412-416 comprise, respectively, audio information from channel 1, video information from channel 1 and audio information from channel 2.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 126 receives these signals, and using the SCID, reassembles the packets to regenerate the program material for each of the channels.

Figure 4B:
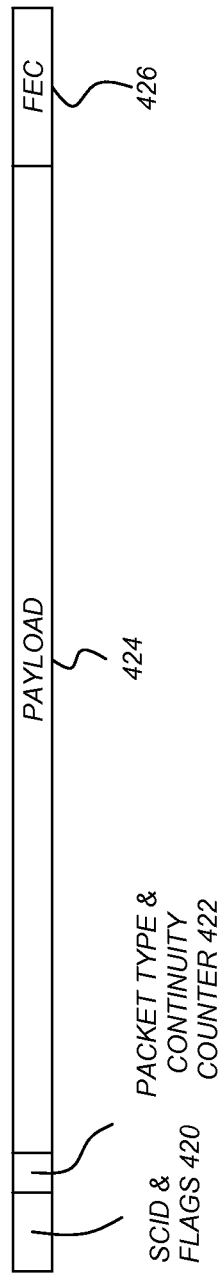
FIG. 4B is a diagram illustrating the structure of a data packet.

FIG. 4B is a diagram of a data packet. Each data packet (e.g. 402-416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control other features. The second packet segment 422 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 424 comprises 127 bytes of payload data, which in the cases of packets 402 or 406 is a portion of the video program provided by the video program source 200. The final packet segment 426 is data required to perform forward error correction.

Integrated Receiver/Decoder

Figure 5:
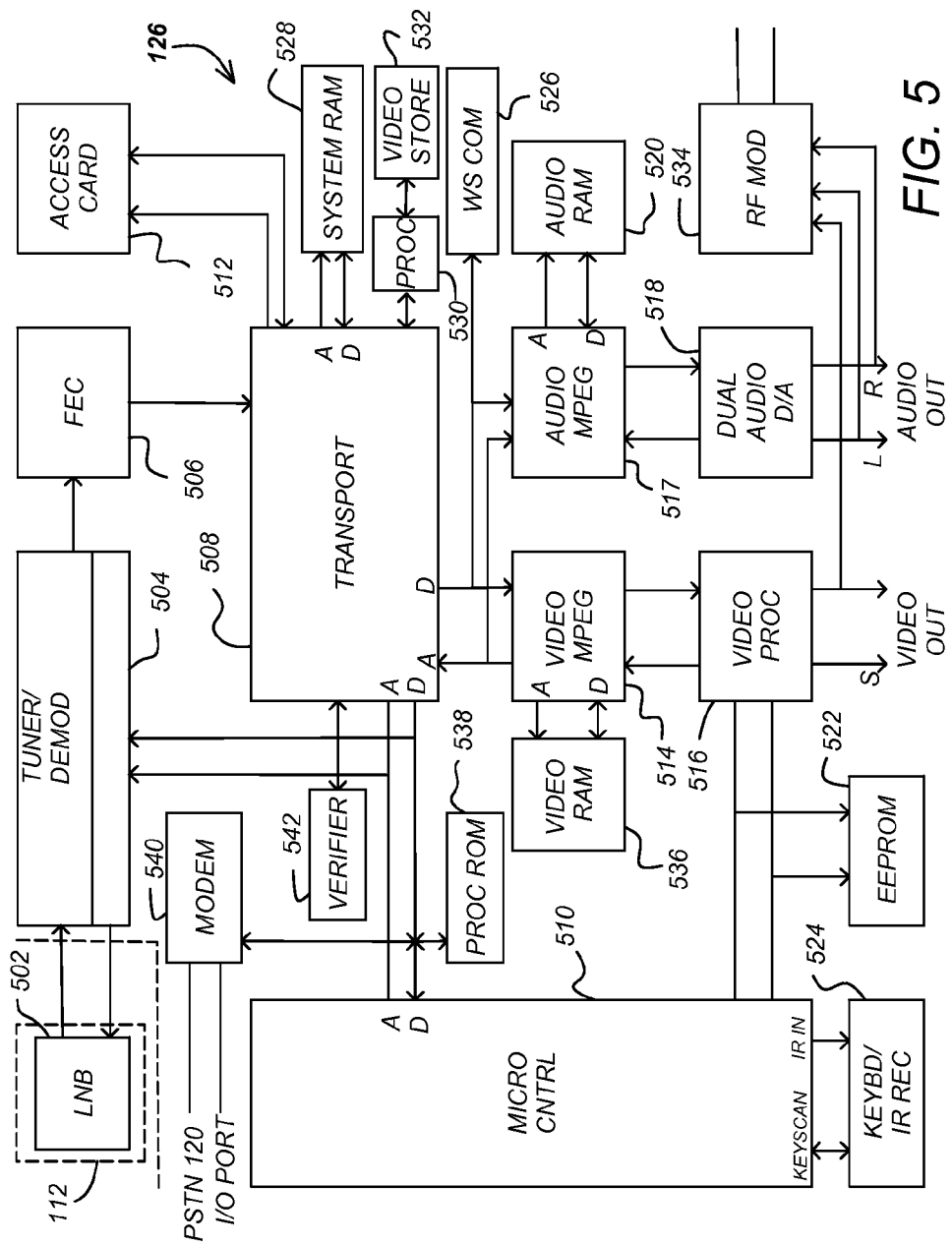
FIG. 5 is a block diagram of one embodiment of an integrated receiver/decoder.

FIG. 5 is a block diagram of an integrated receiver/decoder (IRD) 126 (also hereinafter alternatively referred to as receiver 126 or a set top box). The receiver 126 comprises a tuner/demodulator 504 communicatively coupled to an ODU 112 having one or more LNBs 502. The LNB 502 converts the 12.2- to 12.7 GHz downlink 118 signal from the satellites 108 to, e.g., a 950-1450 MHz signal required by the IRD's 126 tuner/demodulator 504. The LNB 502 may provide either a dual or a single output. The single-output LNB 502 has only one RF connector, while the dual output LNB 502 has two RF output connectors and can be used to feed a second tuner 504, a second receiver 126, or some other form of distribution system.

The tuner/demodulator 504 isolates a single, digitally modulated 24 MHz transponder, and converts the modulated data to a digital data stream. The digital data stream is then supplied to a forward error correction (FEC) decoder 506. This allows the IRD 126 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 126. The transport module 508 processes data received from the FEC decoder module 506 and provides the processed data to the video MPEG decoder 514 and the audio MPEG decoder 517. As needed the transport module employs system RAM 528 to process the data. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the subscriber receiving station 110 is permitted to access certain program material. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a smart card, having contacts cooperatively interacting with contacts in the IRD 126 to pass information. In order to implement the processing performed in the CAM 512, the IRD 126, and specifically the transport module 508 provides a clock signal to the CAM 512. Details of the CAM 512 architecture are described below.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 517 (e.g., using the audio RAM 520). The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 510 receives and processes command signals from the remote control via infrared receiver 524, an IRD 126 keyboard interface 524, and/or another input device. The microcontroller receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 126 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. Video storage device 532 can be a hard disk drive, a read/writeable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigial side band (VSB) suitable as an input signal to a conventional television tuner. This allows the receiver 126 to operate with televisions that lack a video input.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 126 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

In addition, verifier 542 communicates via the transport module 508 with the access card to verify the identity of the smart card 512 and entitlements to certain digital services.

The functionality implemented in the IRD 126 depicted in FIG. 5 can be implemented by one or more hardware modules, one or more software modules defining instructions performed by a processor, or a combination of both.

Access Card

A CAM 512 often contains a microprocessor, memory components (volatile components and nonvolatile components) and a system input/output (I/O) module to communicate with transport 508. Traditional microprocessors within a CAM 512 have nonvolatile memory to contain state that is used to provide the desired functionality and enforce security policies intended by the designers. The microprocessor and/or a memory access control unit restricts access to the memory components. Additionally, identification numbers may identify a CAM 512. However, in the prior art, there is no attempt to isolate the identification numbers from the system I/O module, system bus, microprocessor, or external environment.

As described above, attacks may use unforeseen methods or may subvert poorly implemented defenses to gain unauthorized access to the contents of the memory and/or lead to reprogramming the contents of the memory. For example, most attacks occur by inappropriate manipulation of the microprocessor or memory access control unit. Reprogramming or unauthorized access to the memory contents can lead to complete compromise of the security features intended in the CAM 512. The simplest and most prevalent form of attack against the memory component uses external means using the system I/O module due to the low cost of the equipment required to implement this form of attack. For example, the identification of the CAM 512 may be obtained through the system I/O module or microprocessor and duplicated to create a pirate card.

The invention specifically attempts to secure memory content by hiding it from the external environment by ensuring that it is not placed on the system bus and not available to the microprocessor or system I/O module. Accordingly, to avoid the above-described methods of attack, access to the identification number is hidden by storing the number in a protected nonvolatile memory component not directly connected to the system I/O module, system bus, or microprocessor. The custom logic block is implemented in solid state hardware that implements a simple and well defined state machine. The functions defined in the custom logic block specify a handful of well-defined operations that may be performed using the hidden identification number. By preventing the system I/O module, system bus, microprocessor, or memory access control unit from direct access to the protected nonvolatile memory component (and thereby the identification number and identity of the CAM 512) the previously successful attacks are no longer possible.

Figure 6A:
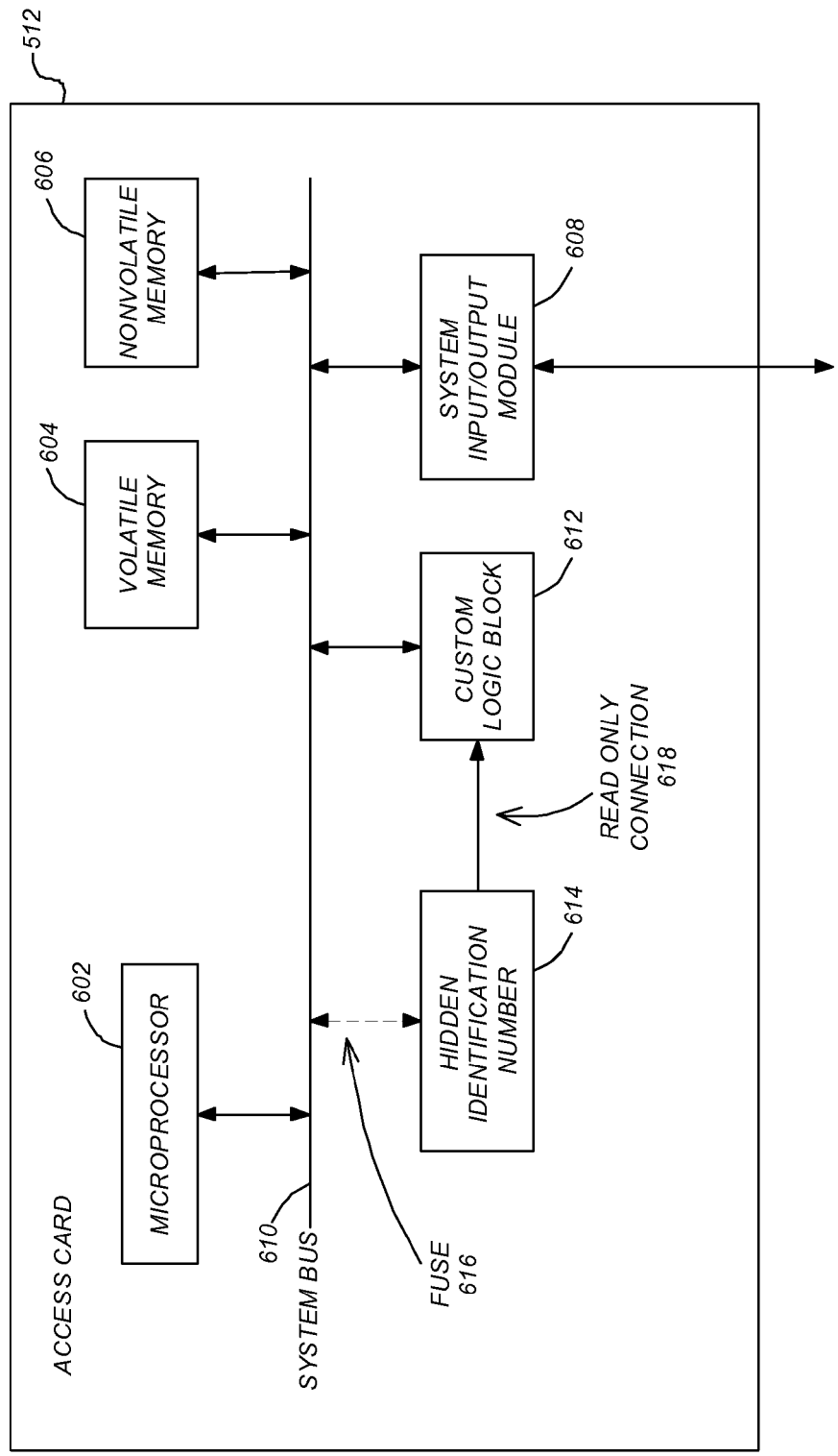
FIGS. 6A and 6B illustrate architectures of a conditional access module in accordance with one or more embodiments of the invention.
Figure 6B:
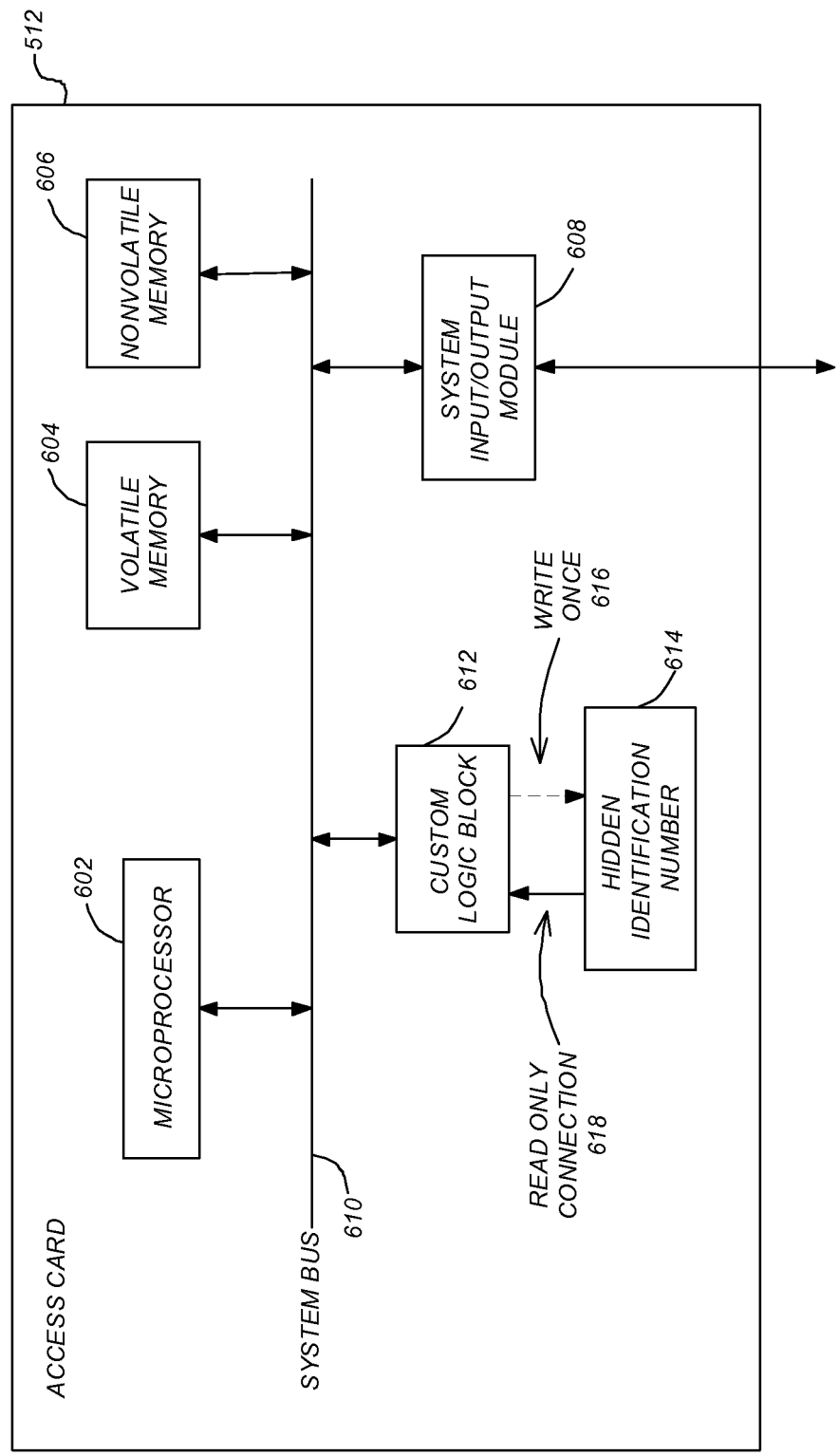

FIGS. 6A and 6B illustrate two architectures of a CAM 512 in accordance with one or more embodiments of the invention. The CAM 512 contains a microprocessor 602, volatile memory components 604 (e.g., random access memory [RAM]), one or more nonvolatile memory components 606 (e.g., electrical erasable programmable read only memory [EEPROM], erasable programmable read only memory [EPROM], or battery packed RAM), a system input/output module 608, a custom logic block 612, and a hidden identification number 614 (that is stored within a separate nonvolatile memory component 606). The various components of CAM 512 may be communicatively coupled to a system bus 610.

Ensuring that the identification number 614 is protected from modification retains the uniqueness of the device (i.e., CAM 512) that is important to many security models. The hidden identification number 614 may be embedded into the CAM 512 after manufacturing.

In FIG. 6A, the hidden identification number 614 is programmed by the microprocessor 602 (across the system bus 610) using a one time programmable memory protected by a hardware fuse 616 that isolates the identification number 614 (and nonvolatile memory component 606 containing the identification number 614) from the microprocessor 602 after the identification number 614 is written. In other words, after the hidden identification number 614 is written, the fuse 616 is blown.

In FIG. 6B, the hidden identification number 614 is programmed by the custom logic block 612 using a onetime programmable memory/write once connection 616. Thus, after the custom logic block 612 writes the hidden identification number 614, the connection 616 no longer exists (e.g., it is destroyed). As in FIG. 6A, the write once connection 616 of FIG. 6B may be a hardware fuse that is blown after the hidden number 614 is written.

Accordingly, in both FIG. 6A and FIG. 6B, after the hidden identification number 614 is written, the identification number 614 is protected because it is not accessible by the microprocessor 602 and hence cannot be altered by external means. Once isolated, the hidden identification number 614 may only be read (and not modified) by custom logic block 612 through the read only connection 618. The custom logic block 612 is implemented in solid state hardware that implements a simple and well defined state machine. The functions defined in the custom logic block 612 specify a handful of well-defined operations that may be performed using the hidden identification number 614.

In addition to the above, the microprocessor's 602 nonvolatile memory component 606 and the nonvolatile memory component containing the hidden number 614 may use the same physical and logical address ranges since they are controlled and programmed by separate entities. Alternatively, the two memory components 606 (and component 606 containing hidden number 614) may use separate address ranges as the system designer sees fit. This helps obscure use of the memory containing the hidden number 614 by potential attackers making it more difficult to determine the memory map and usage of code segments within the CAM 512.

Additionally, the two nonvolatile memory components 606 may share programming charge pumps and programming control. If the pumps and/or programming control are shared, care should be taken to ensure that data and address lines of the nonvolatile memory component 606 containing the hidden number 614 are routed only to the custom logic block 612. This saves chip area and reduces chip cost. Accordingly, the microprocessor 602 cannot provide control information that may lead to a subsequent attack on the protected/dedicated memory component 606 (i.e., the component containing the hidden number 614). Sharing the charge pumps may be preferred to ease timing and high voltage requirements of the entire chip within CAM 512.

There are many advantages to utilizing a hidden identification number 614. For example, the hidden identification number 614 can withstand substantial external attacks without inappropriately modifying the contents of the nonvolatile memory component 606 containing the identification number. Further, by preventing the system I/O module 608, system bus 610, microprocessor 602, or memory access control unit from directly accessing the hidden identification number 614 contained in an isolated nonvolatile memory component 606, traditionally successful security compromises are no longer possible.

Additionally, the integrity of information is significantly improved through isolation of its storage component from the system I/O module 608, system bus 610, and/or microprocessor 602. Protecting the integrity of the hidden number 614 is important because it prevents/limits low cost cloning attacks where the identity of a pirate card is copied to a new card. This attack is limited through the hidden identification number 614.

Since the hidden identification number 614 can only be read by a custom logic block 612 and cannot be reprogrammed by the microprocessor 602, the identity of the CAM 512 cannot be transferred to a second CAM 512, thereby preventing a successful, low cost, clone attack. Thus, the identity of the device (i.e., the CAM 512) is protected for use in operations with the CAM 512, IRD 126, and headend. For example, the CAM 512 provides non-modifiable uniqueness (i.e., stored via the hidden identification number 614 of protected memory in a nonvolatile memory component 606) that can be used to prevent cloning of the CAM 512 to obtain unauthorized access. Additionally, the CAM 512 may enable an IRD 126 to provide non-modifiable pairing and blacklist capabilities, and may enable a headend to control access rights and the blacklist. A blacklist is utilized to prevent CAMs 512 with a particular identification to be used/cloned. With a blacklist, the headend may provide a list of blacklisted/unauthorized cards to an IRD 126. The IRD 126 then refuses to grant access rights if the CAM 512 being utilized is on the blacklist. Accordingly, uniquely identified CAMs 512 with a unique identification that is only accessible through a custom logic block 612 may be utilized to prevent unauthorized access and cloning.

Preventing low cost attacks forces attackers to use expensive invasive attacks that are not available to the vast majority of pirates. Inhibiting this simple form of attack prevents intruders from using attacks that require only a personal computer and a $ 10 card reader. Instead, pirates are forced to utilize sophisticated, costly, and time consuming invasive attacks in which the actual hardware is modified. Additionally, further compromise of one device through an internal, invasive attack does not lead to a successful attack on other devices through a low cost, external attack.

Figure 7:
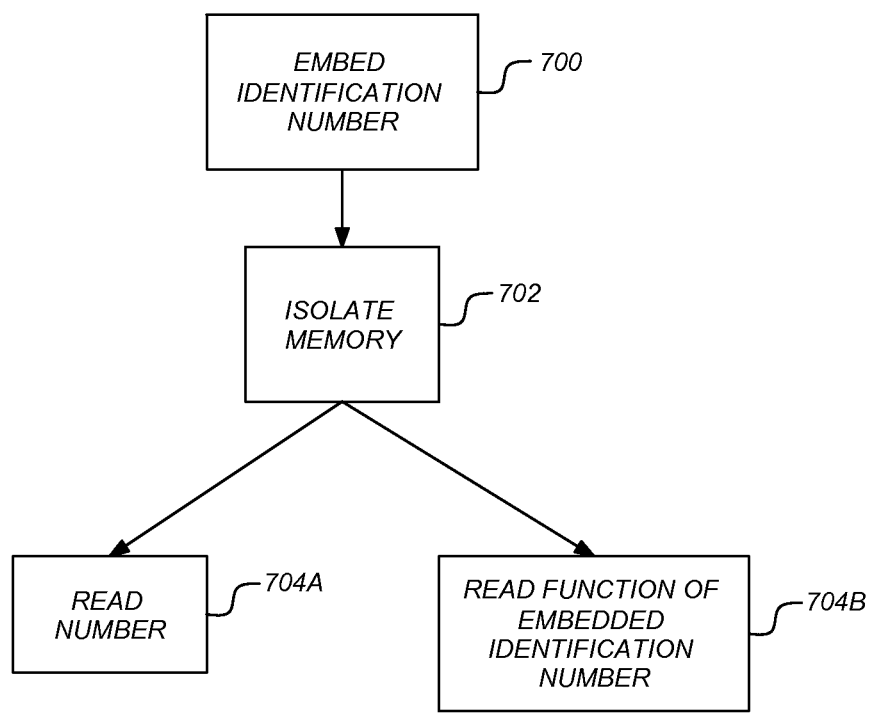
FIG. 7 is a flow chart illustrating the use of a hidden identification number to limit unauthorized access to digital services in accordance with one or more embodiments of the invention.

FIG. 7 is a flow chart illustrating the use of hidden identification number 614 to limit unauthorized access to digital services in accordance with one or more embodiments of the invention. At step 700, the hidden non-modifiable identification number 614 is embedded (e.g., by a microprocessor 602 or a custom logic block 612) into a nonvolatile memory component 606. The number 614 uniquely identifies a device (e.g., CAM 512) that contains the nonvolatile memory component 606 (that contains the number 614). Such embedding occurs after manufacturing the CAM 512. As described above, the nonvolatile memory component 606 is used to contain state information to provide desired functionality and enforce one or more security policies for accessing digital services.

At step 702, access to the nonvolatile memory component 606 is isolated such that the identification number 614 (and nonvolatile memory component containing the hidden number 614) is protected from modification such that the nonvolatile memory component 606 is read only. The memory component 606 may be isolated by preventing a system I/O module 608, system bus 610, microprocessor 602, or external environment from direct access to the identification number 614. For example, as described above, the identification number 614 may be embedded using a onetime programmable memory that is protected by a hardware fuse that isolates the identification number 614/and component 606 from the microprocessor 602 after the identification number 614 is written.

Under one option, at step 704A, the identification number 614 is read by a custom logic block 612. The identification number 614 may be read for use in a function defined in the custom logic block 612, wherein the function specifies an operation to be performed using the identification number 614. For example, to activate or ensure that a user is authorized to receive/use broadcast digital services, the identification number 614 may be read by the custom logic block 612 pursuant to a security policy enforced by the nonvolatile memory 606 within CAM 512. Thus, access to the digital services are based on access rights associated with the hidden non-modifiable identification number 614. For example, if the hidden number 614 exists on a blacklist (i.e., a list of unauthorized numbers 614 as described above), access to the digital services may be rejected.

Thus, as described, the identification number 614 is embedded into nonvolatile memory 606 (at step 700) and the nonvolatile memory 606 is isolated (thereby hiding access to and modification of the identification number 614) (at step 702). Once the identification number 614 has been embedded into the memory 606, the card maintains a non-modifiable identity that can then be used to enforce a security policy (e.g., by reading the identification 614 at step 704A under a first option) based on that unique identity.

The use of an identification number 614 in this manner significantly improves the integrity of information through isolation of the information's storage component (e.g., nonvolatile memory 606) from the system I/O module 608, system bus 610, and/or microprocessor 602. Manipulation of stored content is also reduced through direct connection of a read-only fixed state custom logic block machine 612. Thus, information (e.g., the identification number 614 or other information) may be written once, and hidden from the system I/O module 608, system bus 610, and/or microprocessor 602. Further, the custom logic block 612 can be used to hide information from these other components.

Alternatively, rather than reading the hidden number at step 704A, one or more embodiments of the invention may provide for reading a function of the embedded identification number at step 704B. Such a hidden identification number may be used with an identification algorithm or procedure to validate the smart card identity. Such identification algorithms and procedures are more clearly set forth in the Handbook of Applied Cryptography, by A Menezes, P. van Oorschot, and S. Vanstone, CRC Press, at chapter 10, pages 385-424 (1996) and the use of a zero-knowledge identification algorithm in the field of satellite television is set forth in U.S. Pat. No. 5,282,249 by Cohen et al., filed on Dec. 18, 1992 and issued on Jan. 25, 1994, both of which are fully incorporated by reference herein. Such identification algorithms and procedures assume a secret-value (e.g., hiddennumber) and an algorithm that uses the hidden number and other information (e.g. random challenge number) to provide an output that is a function of the hidden number, and which can be used to validate the identity of an entity without revealing information that can later be used to impersonate that entity.

In the prior art, the hidden identification numbers have been stored in non-volatile memory directly accessible for reading or writing by the internal microprocessor, which performs the identification procedures or algorithms in software. In these embodiments, the hidden information was assumed to be adequately protected because the system input-output was not designed with specific commands to read or change this data. However, pirates have frequently succeeded in cloning attacks on such systems using external noninvasive attacks to read hidden information from the volatile or nonvolatile memory components, by inappropriate manipulation of a microprocessor or memory access control unit. One or more embodiments of the present invention improve on such identification schemes by storing the hidden number in a separate non-volatile memory 614 that is isolated from the processor 602 via a custom logic block 612, where this custom logic provides a hardware embodiment of the corresponding theoretical identification algorithm or function. Thus, in one or more embodiments, a hidden identification number 614 is used with a zero-knowledge identification procedure to validate the smart card 512 identity. Access to digital services may be based on this validation of identification information, where the IRD 126 may deny service for invalidated cards, and also reject any cards whose identity number does not match the authorized paired card number received from the broadcast headend 104, or whose card identity does not appear in a received list of authorized cards, or whose identity number does appear in a received blacklist of pirate cards.

Of particular note, in many or all of the embodiments described herein, the IRD 126 explicitly performs the access prevention techniques (e.g., the identity-based rejection of a cloned CAM 512 or other limiting of cloning based attacks). For example, a CAM 512-rejection by an IRD 126 may be important to disallow services which cannot naturally be encrypted (so that rights-keys would be ineffective). Further, in one or more embodiments, the use of an IRD 126 to perform as a digital video recorder (DVR), or to execute stored games, may be limited to receivers 126 that include an authorized and valid CAM 512, even though the CAM 512 may not be explicitly involved in performing the function, (unlike decrypting broadcast content, which required the CAM 512 to provide decryption keys).

In at least another embodiment of this invention, a hidden identification number 614 is used with a digital signature algorithm and a random challenge value to authenticate the card identification number using the hidden identification number as the secret authenticating private key. This digital signature algorithm may use symmetric or asymmetric cryptographic algorithms, where the verifier may validate the digital signature using secret key with a symmetric algorithm or a public key with an asymmetric algorithm.

In at least another embodiment of this invention, a hidden identification number 614 is used with a digital signature algorithm to authenticate access control messages from the broadcast headend 104 that are addressed to the smart card 512 and used to deliver access rights, so that invalid or incorrectly addressed messages are rejected. In at least another embodiment of the invention, a hidden identification number 614 is used with a decryption algorithm so that incorrectly decrypted authorization messages will not be understood or processed if an incorrect identification number is used.

In at least another embodiment of this invention, a hidden identification number 614 is used with a public or private key encryption function to encrypt media decryption keys that are provided from the smart card 512 to the IRD 126 for decrypting received digital services. Access to the digital services requires the IRD 126 to first decrypt the media decryption keys, using pairing information related to the hidden identification number 614, and received by the IRD 126 from the headend 104 when a smart card 512 is married to an IRD 126. Access to the received digital services is denied to any other smart card 512, whose hidden identification information does not correspond to the authorized pairing information. In an alternate embodiment of the invention, pairing information may also be delivered to the smart card 512, protected and/or validated using hidden identification numbers 614.

In at least another embodiment of the invention, a hidden identification number 614 is used to validate messages from the IRD 126 or CAM 512 back to the broadcast headend 104, which messages may be required to obtain access to certain digital services or to place validated orders for media services or other goods or services via interactive user menu selections.

Figure 8:
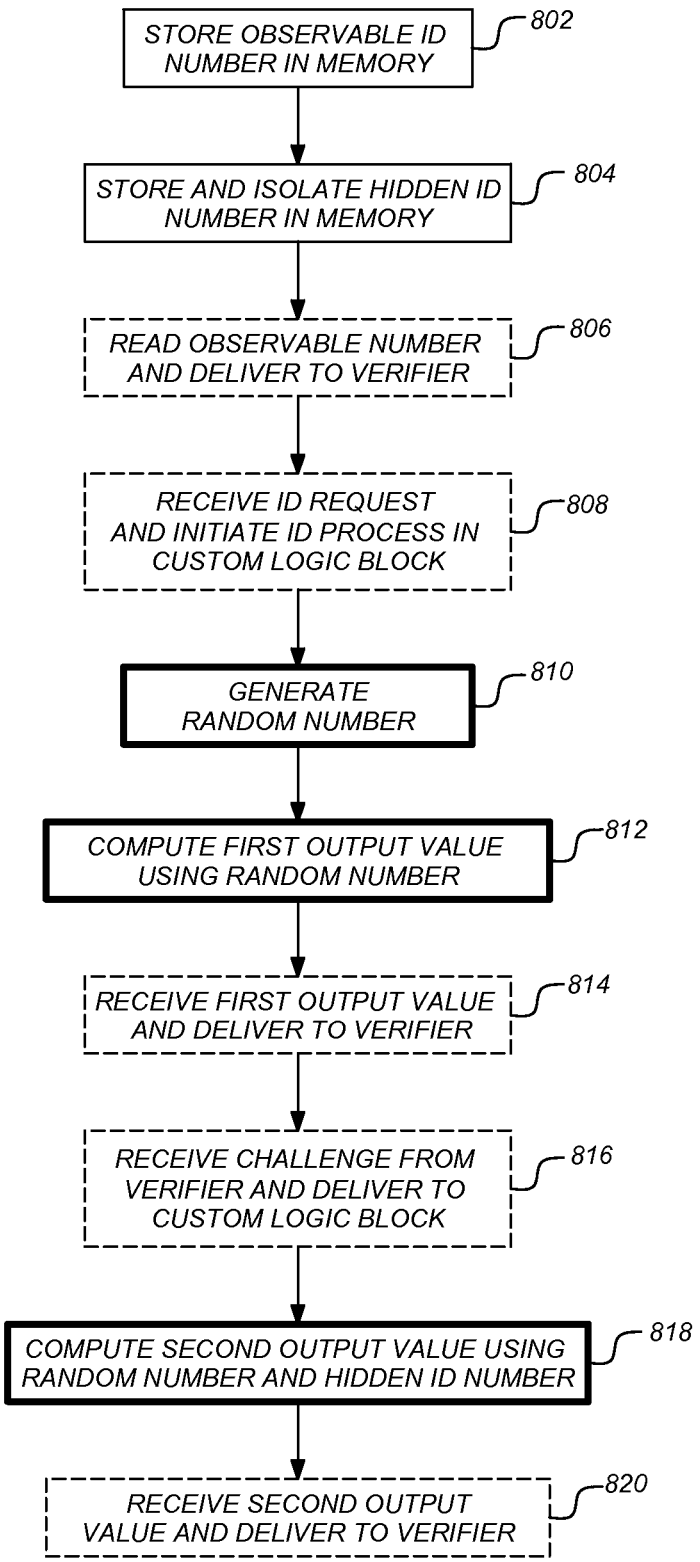
FIG. 8 illustrates the logical flow for using a hidden identification number in accordance with one or more embodiments of the invention.

FIG. 8 illustrates the logical flow for using a hidden identification number 614 in accordance with one or more embodiments of the invention. This explanation is based on a preferred embodiment which validates the observable identification number by way of a Fiat-Shamir zero-knowledge identification procedure. At step 802, the observable identification number V is stored in regular nonvolatile memory 606. At step 804, the hidden identification number S is stored and then isolated in non-volatile memory 614 where the value of S corresponds to $S^2 = V \bmod N$. According to the algorithm specification, the modulus N must be selected as a large product of two secret primes, where N should be at least 512 bits, preferably closer to 1024 bits. The value V must be selected to be a quadratic residue mod N, so that $S^2 = V \bmod N$ has a solution and V has an inverse, i.e. $V^{-1} \bmod N$ exists. In this regard, the secret value S corresponds to the square root of V in the finite field, which is computationally intractable for large values of N and is the basis for the security of this algorithm. Knowledge of the two secret prime factors of N, on the other hand, allows the system operator to easily determine an appropriate value for S to be stored in the hidden non-volatile memory.

In FIG. 8, the dashed boxes (i.e., boxes 806, 808, 814, 816, and 820) represent actions performed by the microprocessor 602 while the bold solid boxes (i.e., boxes 810, 812, and 818) represent actions performed by custom logic block 612. At step 806, microprocessor 602 via the system bus 610 reads the observable identification number from non-volatile memory 606 and delivers it to the verifier 542 via system bus 610 and system input/output module 608. Such a delivery indicates the intent to verify the authenticity of the CAM having the observable identification number provided.

At step 808, the microprocessor 602 receives an identification request from a verifier 542 (e.g., within the IRD 126) via a system input-output module 608 and system bus 610. The microprocessor 602 then initiates the identification process in the custom logic block 612.

At step 810, in response to the initiation of the identification process, the custom logic block 612 generates a random number R using a random number generator (or pseudo-random number generator) thereby placing it in an internal memory register. At step 812, the custom logic block 612 uses the random number R to compute a first output value X wherein $X=R^2 \bmod N$.

At step 814, the microprocessor 602 receives the computed value X from the custom logic block 612 (i.e., via system bus 610) and delivers X to the verifier 542 via the system bus 610 and system input/output module 608.

At step 816, the microprocessor 602 receives a challenge input (e.g., Q=0 or Q=1) from the verifier 542 via the system input-output module 608 and system bus 610. The microprocessor 602 delivers the challenge to the custom logic block 612 via the system bus 610.

At step 818, the custom logic block 612 receives the challenge (e.g., the value Q) and selects or computes a second output value Y based on the logic contained therein. Such logic may produce an output value Y=R (if Q=0) or Y=RS mod N (if Q=1) where R is the random number stored in the internal register and S is the hidden identification number that may be read by the custom logic block 612 from the hidden nonvolatile memory 614.

At step 820, the custom logic block 612 provides the selected value Y to the microprocessor 602 that delivers the selection to the verifier 542 via the system bus 610 and system input/output module 608 at step 820.

In view of the above, to validate the observed identification number V, the verifier 542 challenges the card 512 to prove it's identity via a Fiat-Shamir procedure described herein. In such a procedure, the card 512 provides a first response, the verifier 542 issues a random challenge Q and the card 512 provides a second response. The verifier 542 can check the responses by the following computations using the second response and depending on Q, and check whether the answer matches the first response from the card 512.

As described above, if Q=0 and the card 512 responded with Y=R then the verifier 542 can compute and confirm $Y^2 \bmod N = R^2 \bmod N = X$. Alternatively, if Q=1 and the card 512 responded with Y=RS mod N then the verifier 542 can compute and confirm $Y^2 \bmod N = R^2 S^2 \bmod N = XV \bmod N$ thereby proving that $S^2 = V \bmod N$ and validating the hidden identification.

It should be noted that this identification procedure may only provide one bit of information, since a hacker, without knowledge of S, can still provide a correct pair of responses with probability ½. The hacker can provide the correct response for Q=0 but will fail if the verifier chooses Q=1. Alternately the hacker can provide a first response $(R^2)/V$ mod N and a second response R in which case the verification would succeed for Q=1 but fail for Q=0. Since there is a probability of ½ that the hacker will fail, while the true card always succeeds, the verifier 542 has only 50% confidence in the test, and therefore needs to repeat the test a number of times to improve the confidence, e.g., by repeating the above described procedure twenty (20) independent times, the hacker has only $(½)^{20}$ chance of success (i.e., one in a million) with a corresponding increase in verifier confidence.

As may be understood, the security of the identification depends on the size of the modulus N, as well as the secret prime factorization of N. The verifier 542 must reliably receive and securely store the value N, for example by embedding N in the verifier at the time of manufacture. The verifier cannot rely on a value of N received from the card 512. However, as described in step 806, the verifier 542 may receive the identification number V from the card 512 since the identification procedure uses N to validate V. In alternate embodiments, V need not be stored in the card or provided by the card 512. For example, the value V may be calculated from X and Y and confirmed by repeated identifications. Alternately, the verifier 542 may receive V in a message from the control center 102 identifying the card(s) authorized for access, subject to validation as above.

Thus, the custom logic block contains hardware configured to use the hidden non-modifiable identification number and other information to provide an output that is a zero knowledge proof of identity. Further, the output may comprise a digital signature using the hidden non-modifiable information number as a secret signing key by using the data to be signed, or a hash thereof, as a sequence of random challenge values Q.

In alternate embodiments of this invention, the custom logic block may include hardware configured to perform a symmetric or an asymmetric encryption algorithm or a symmetric or an asymmetric signature algorithm using the hidden non-modifiable information number as a secret encryption or signing key. Such embodiments of a custom logic block may be used to encrypt or sign messages and/or random values and thereby to perform alternate identification algorithms and procedures described in the above examples and references, wherein the response generated by the custom logic block based on the hidden information may be used by the verifier to confirm the identity of the device.

Figure 9:
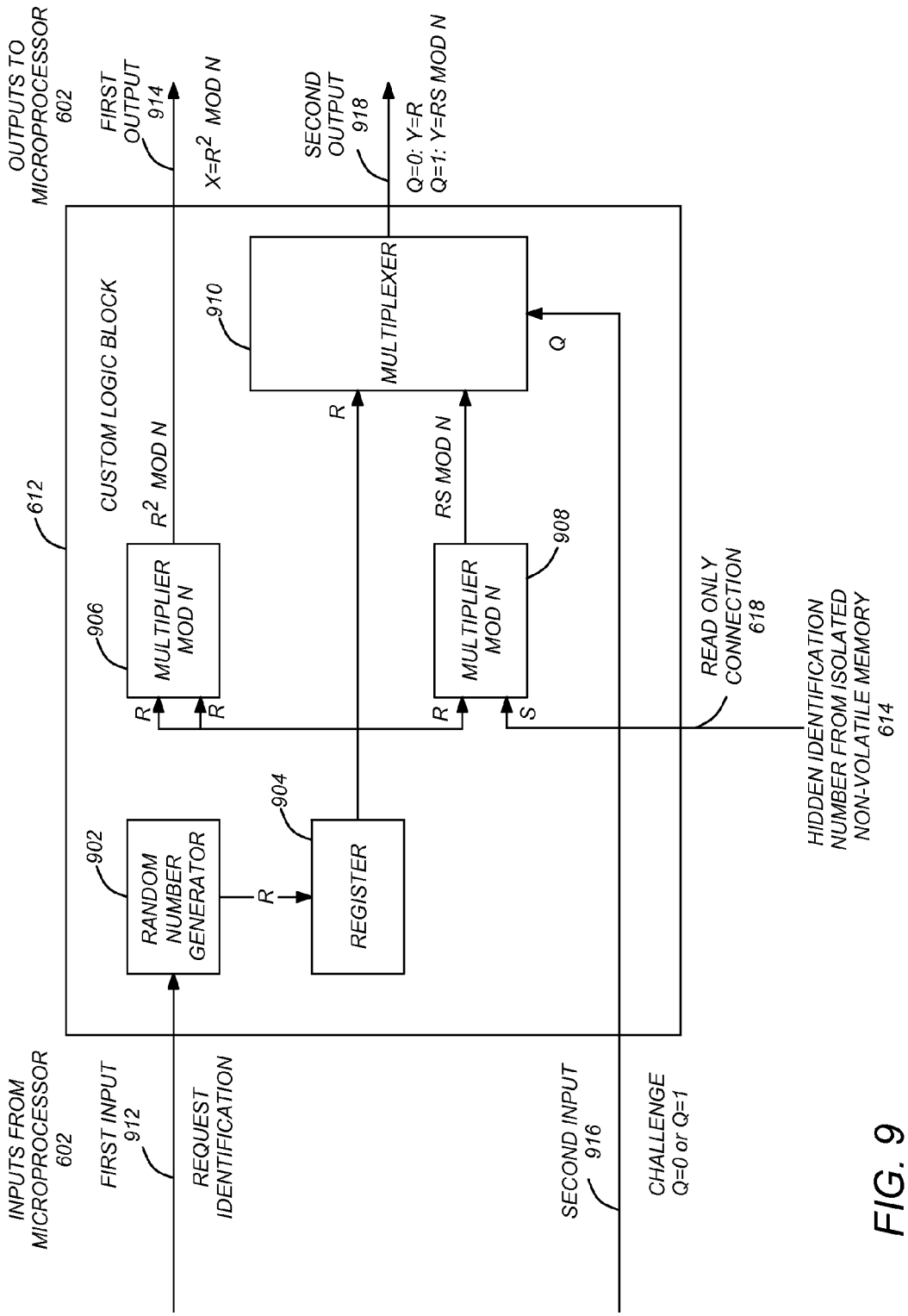
FIG. 9 is a logic diagram of a custom logic block using a hidden identification number in accordance with one or more embodiments of the invention.

In view of the above description, FIG. 9 illustrates a logic diagram for a custom logic block 612 using a hidden identification number with a Fiat-Shamir identification procedure. The custom logic block 612 contains/comprises circuitry 902 to generate a random or pseudo-random number R at step 810 in response to an identification request from the microprocessor 602 at step 808 and to store the output R of the random number generator 902 in an internal (volatile) memory register 904. Further, the custom logic block 612 also contains/comprises circuitry to execute two multiplications mod N. The first multiplication circuit 906 computes $R^2 \bmod N$ using as input the random number R from register 904. The second multiplication circuit 908 computes RS mod N using as a first input the random number R from register 904 and as a second input the hidden identification number S, which the custom logic block 612 receives via a read-only connection 618 from the hidden memory 614. Further, the custom logic block 612 also contains/comprises multiplexer circuitry 910 to select between the contents of the first register 904 and the output of the second multiplication circuit 908.

The custom logic block 612 in FIG. 9 contains/comprises circuitry that accepts a first input 912 from the microprocessor comprising a request for identification at step 808. The custom logic block circuitry then activates the random number generator 902 at step 810, stores the output R in the register 904, activates the first multiplication circuit 906 at step 812 and provides the output $X=R^2 \bmod N$ of the first multiplication circuit 906 to the microprocessor 602 at step

814 as the first output 914 of the custom logic block 612 in response to the request for identification.

Further, the custom logic block 612 in FIG. 9 contains/comprises circuitry that accept a second input 916 from the microprocessor 602 at step 816, this input value comprising a challenge value Q. The custom logic block circuitry then activates the second multiplier circuit 908, and provides the challenge value Q to the multiplexer 910 at step 818 to select either the value R contained in the first register 904 (for Q=0) or the value RS mod N that is output from the second multiplication circuit 908 (for Q=1). The custom logic block circuitry then provides the selected value Y that is output from the multiplexer to the microprocessor 602 at step 820 as the second output 918 of the custom logic block 612 in response to the challenge value.

In the light of the above teaching, those versed in the art will recognize many alternate embodiments of the custom logic block 612. Whereas FIG. 9 shows two separate multiplier circuits, an alternate embodiment may use the same multiplier circuit for both multiplication operations, securely controlled by a hardware state machine (not software) in the custom logic block 612. Further, the second multiplication may only be performed if needed in response to the challenge value Q=1. Further, the value of the modulus N may be built-in to the multiplier circuits, or in a generic embodiment of the custom logic block 612 the modulus may be stored in isolated non-volatile memory and accessed by the multiplier circuitry.

Also, a custom logic block may use multiple hidden identification numbers. For example, the observable identification number may be associated with twenty (20) public values $\{V(1)\ldots V(20)\}$ corresponding to the mod N square roots of twenty (20) secret numbers $\{S(1)\ldots S(20)\}$. Then, instead of repeating the above procedure twenty (20) times to achieve million-to-one reliability, the custom logic block may access the protected non-volatile memory to compute the response Y to a twenty (20) bit challenge value $\{Q(1)\ldots Q(20)\}$ where the response $Y=RS(1)^{Q(1)}S(2)^{Q(2)}\ldots S(20)^{Q(20)}$ mod N corresponds to the mod N product of the random value R and those values S(i) corresponding to Q(i)=1. A similar custom logic block may be used to compute a digital signature, wherein the challenge bit values correspond to a hash of the message to be signed.

Such a computation may be iteratively performed using a custom logic block 612 similar to that illustrated in FIG. 9, wherein the challenge bit values $\{Q(1)\ldots Q(20)\}$ are provided one by one by the processor as a sequence of second input values 916 and the corresponding intermediate second output values 918 are internally routed and stored in the internal register 904 for use in the subsequent step, the $20^{th}$ output value 918 being provided as output from the custom logic block 612 for delivery to the verifier as the response Y to the 20-bit challenge (or together with the first output 914 comprising the signature of the 20-bit hash of the message).

In any embodiment of such a custom logic block 612 care must be taken to protect the secret hidden value S from disclosure, by accident or malicious intent by inappropriate microprocessor inputs or variation of clock speeds, etc. The circuit should avoid the possibility of information leakage between the circuitry reading the secret value from the hidden memory and the first or second outputs. Further, the circuitry should protect operating on the secret value S by values of R that may allow easy computation of S, for example, by avoiding small random numbers R or by ensuring that the contents of register 904 is completely loaded before performing further computations. Further, a hardware state machine may be used to ensure that the operations cannot be performed out of sequence, that the challenge-response step may only be executed once per random number, and that internal registers and states are reset after completion of the challenge output. Likewise, a hardware state machine may ensure the correct sequence of steps and use of appropriate hidden secret values and protection of intermediate values when such a custom logic block iteratively computes the validation output based on a multi-bit challenge to as outlined above.

It should be noted that the modulus N is the public key on which the security of the identification verification depends, and while it is not secret, must be carefully protected from alteration. This may be achieved in the smart card 512 by building the value N directly into the multiplication circuitry of the custom logic block 612 or by storing N in the isolated non-volatile memory 614 to be accessed by the custom logic block. If the value of N were not protected from alteration (e.g. if it were stored in the unprotected non-volatile memory 602) then it could be replaced by a smaller value, or one whose prime factors are known, allowing a hacker to compute the value of the secret value S stored in protected memory by observing the output values $X=R^2$ mod N and Y=RS mod N based on the replaced value of N.

Similarly, the value of N that is used by the verifier must be securely installed in the verifier 542 (e.g. received from the headend 104 or system operator, or built-in to the verifier 542). If the verifier 542 were to accept any value of N from the smart card 512, this could potentially enable a hacker to select their own values of V, N and S and thereby trick the verifier 542 into accepting the hacker's V as a valid identification number. Accordingly, when the smart card 512 is required to support multi-modulus applications (e.g. a number of backup values of N or different service operators, e.g. banks, each with their own value of N) then a built-in list of N and the corresponding S values may be stored in isolated NVRAM 614, and may be selected by the verifier 542 using an index into the list (e.g. $\{S(k)N(k)\}$) where the index corresponds to the value of N that is built into the verifier.

In the light of the above teaching, those versed in the art will also recognize alternate embodiments of the identification device. For example, the identification device need not be embodied as a smart card 512 nor need it comprise a microprocessor 602. With reference to FIG. 9, the identification device may comprise the hidden and non-modifiable memory 614 and the custom logic block 612 which may be communicatively coupled with the identity verification device 542 which directly provides inputs 912 and 916 and receives identification outputs 914 and 918.

While the foregoing description refers to a particular example of a Fiat-Shamir identification procedure, those skilled in the art can appreciate that alternate identification algorithms and procedures may also be embodied in a custom logic block using hidden identification values that are stored in a separate non-volatile memory.

CONCLUSION

This concludes the description of one or more embodiments of the present invention. The foregoing description of the invention has been presented for the purposes of illustration and description. It is not intended to be exhaustive or to limit the invention to the precise form disclosed. Many modifications and variations are possible in light of the above teaching. Accordingly, while the invention may protect video, audio, broadband and data services reception using a microcircuit that resides in a smart card and set top box, the invention is not limited to smart card applications or to a particular digital service system.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for controlling access to digital services comprising:
  (a) a control center configured to coordinate and provide digital services;
  (b) an uplink center configured to receive the digital services from the control center and transmit the digital services to a satellite;
  (c) the satellite configured to:
    (i) receive the digital services from the uplink center;
    (ii) process the digital services; and
    (iii) transmit the digital services to a subscriber receiver station;
  (d) the subscriber receiver station configured to:
    (i) receive the digital services from the satellite;
    (ii) control access to the digital services through an integrated receiver/decoder (IRD); and
    (iii) enforce one or more identity-based security policies for accessing the digital services;
  (e) a conditional access module (CAM) communicatively coupled to the IRD, wherein the CAM comprises:
    (i) a protected nonvolatile memory component, wherein:
      (1) the protected nonvolatile memory component is used to contain identification information; and
      (2) the protected nonvolatile memory component is protected from modification such that the protected nonvolatile memory component is read only; and
      (3) access to the protected nonvolatile memory component is isolated;
    (ii) a hidden non-modifiable identification number embedded into the protected nonvolatile memory component, wherein the identification number uniquely identifies the CAM; and
    (iii) a custom logic hardware block, wherein:
      (1) the protected nonvolatile memory component is not directly accessible via a system bus;
      (2) access to the protected nonvolatile memory component is limited to the custom logic hardware block;
      (3) the custom logic hardware block comprises a hardware state machine configured to use the hidden non-modifiable identification number and other information to provide an output that is a function of the hidden non-modifiable identification number and that can be used to confirm an identity of the CAM without revealing information that could be used to impersonate the identity of the CAM; and
      (4) the confirming of the identity is used to condition performance of digital services, wherein the digital services cannot naturally be encrypted and wherein the CAM is not explicitly involved in performing the digital services.

2. The system of claim 1 wherein the hardware state machine in the custom logic hardware block is configured to use the hidden non-modifiable identification number and the other information to provide the output, wherein the output is a zero knowledge proof of identity.

3. The system of claim 2 wherein the hidden non-modifiable identification number is represented by S, wherein $v=S^2$ mod N and V is an identification number and N is a modulus comprising a public key.

4. The system of claim 2 wherein a verifier, in the IRD, initiates an identification process in the custom logic hardware block.

5. The system of claim 4 wherein the identification process comprises:
  the custom logic hardware block generating a random number R;
  the custom logic hardware block computing $R^2$ mod N;
  the custom logic hardware block computing RS mod N;
  the custom logic hardware block transmitting $X=R^2$ mod N to the verifier;
  the custom logic hardware block receiving a challenge input from the verifier;
  the custom logic hardware block selecting Y=R or Y=RS mod N depending on the challenge input;
  the custom logic hardware block transmitting the selected Y to the verifier; and
  the verifier confirming the identification number V based on a computation performed by the verifier using the received values X and Y.

6. The system of claim 1 wherein the hardware state machine in the custom logic hardware block is configured to use the hidden non-modifiable identification number and the other information to provide the output, wherein the output is a digital signature using the hidden non-modifiable information number as a secret signing key.

7. The system of claim 1 wherein the hardware state machine in the custom logic hardware block is configured to use the hidden non-modifiable identification number and the other information to provide the output, wherein the output is a symmetric or an asymmetric encryption using the hidden non-modifiable information number as a secret encryption key.

8. The system of claim 1 wherein the protected nonvolatile memory component is isolated such that a system input/output module, microprocessor, or external environment is prevented from direct access to the identification number.

9. The system of claim 1 wherein the hardware state machine in the custom logic hardware block comprises:
  a random number generator configured to generate a random number;
  a register configured to store the random number;
  a first multiplier configured to perform a first modulus operation using the random number from the register;
  a second multiplier configured to perform a second modulus operation using the random number from the register and the hidden non-modifiable identification number; and
  a multiplexer configured to multiplex results from the one or more multipliers to produce output.

10. A method for limiting unauthorized access to digital services comprising:
  (a) embedding a hidden non-modifiable identification number into a protected nonvolatile memory component, wherein:
    (i) the hidden non-modifiable identification number uniquely identifies a device containing the protected nonvolatile memory component;
    (ii) access to the digital services is based on access rights associated with the hidden non-modifiable identification number; and
  (b) isolating access to the protected nonvolatile memory component wherein:

(i) access to the protected nonvolatile memory component is limited to a custom logic hardware block;
(ii) the protected nonvolatile memory component is protected such that the protected nonvolatile memory component is read only;
(iii) the protected nonvolatile memory component is not directly accessible via a system bus;
(iv) the custom logic hardware block comprises a hardware state machine configured to use the hidden non-modifiable identification number and other information to provide an output that is a function of the hidden non-modifiable identification number and that can be used to confirm an identity of the device without revealing information that could be used to impersonate the identity of the device; and
(v) the confirming of the identity is used to condition performance, by an integrated receiver/decoder (IRD) of digital services, wherein the digital services cannot naturally be encrypted and wherein the device is not explicitly involved in performing the digital services.

11. The method of claim 10 wherein the custom logic hardware block is configured to use the hidden non-modifiable identification number and the other information to provide the output, wherein the output is a zero knowledge proof of identity.

12. The method of claim 11 wherein the hidden non-modifiable identification number is represented by S, wherein $v=S^2$ mod N and V is an identification number and N is a modulus comprising a public key.

13. The method of claim 11, further comprising, a verifier, in the IRD, initiating an identification process in the custom logic hardware block.

14. The method of claim 13 wherein the identification process comprises:
the custom logic hardware block generating a random number R;
the custom logic hardware block computing $R^2$ mod N;
the custom logic hardware block computing RS mod N;
the custom logic hardware block transmitting $X=R^2$ mod N to the verifier;
the custom logic hardware block receiving a challenge input from the verifier;
the custom logic hardware block selecting Y=R or Y=RS mod N depending on the challenge input;
the custom logic hardware block transmitting the selected Y to the verifier; and
the verifier confirming the identification number V based on a computation performed by the verifier using the received values X and Y.

15. The method of claim 10 wherein the hardware state machine in the custom logic hardware block is configured to use the hidden non-modifiable identification number and the other information to provide the output, wherein the output is a digital signature using the hidden non-modifiable information number as a secret signing key.

16. The method of claim 10 wherein the hardware state machine in the custom logic hardware block is configured to use the hidden non-modifiable identification number and the other information to provide the output, wherein the output is a symmetric or an asymmetric encryption using the hidden non-modifiable information number as a secret encryption key.

17. The method of claim 10 wherein the protected nonvolatile memory component is isolated such that a system input/output module, microprocessor, or external environment is prevented from direct access to the identification number.

18. The method of claim 10 wherein the hardware state machine in the custom logic hardware block comprises:
a random number generator configured to generate a random number;
a register configured to store the random number;
a first multiplier configured to perform a first modulus operation using the random number from the register;
a second multiplier configured to perform a second modulus operation using the random number from the register and the hidden non-modifiable identification number; and
a multiplexer configured to multiplex results from the one or more multipliers to produce output.

19. A conditional access module (CAM), comprising:
(a) a protected nonvolatile memory component, wherein:
(i) the protected nonvolatile memory component is used to contain identification information; and
(ii) the protected nonvolatile memory component is protected from modification such that the protected nonvolatile memory component is read only; and
(iii) access to the protected nonvolatile memory component is isolated;
(b) a hidden non-modifiable identification number embedded into the protected nonvolatile memory component, wherein the identification number uniquely identifies the CAM;
and
(c) a custom logic hardware block, wherein:
(i) the protected nonvolatile memory component is not directly accessible via a system bus;
(ii) access to the protected nonvolatile memory component is limited to the custom logic hardware block;
(iii) the custom logic hardware block comprises a hardware state machine configured to use the hidden non-modifiable identification number and other information to provide an output that is a function of the hidden non-modifiable identification number and that can be used to confirm an identity of the CAM without revealing information that could be used to impersonate the identity of the CAM; and
(iv) the confirming of the identity is used to condition performance of digital services by an integrated receiver/decoder (IRD), wherein the digital services cannot naturally be encrypted and wherein the CAM is not explicitly involved in performing the digital services.

20. The CAM of claim 19 wherein the hardware state machine in the custom logic hardware block is configured to use the hidden non-modifiable identification number and the other information to provide the output, wherein the output is a zero knowledge proof of identity.

21. The CAM of claim 20 wherein the hidden non-modifiable identification number is represented by S, wherein $v=S^2$ mod N and V is an identification number and N is a modulus comprising a public key.

22. The CAM of claim 20 wherein a verifier, in the IRD, initiates an identification process in the custom logic hardware block.

23. The CAM of claim 22 wherein the identification process comprises:
the custom logic hardware block generating a random number R;
the custom logic hardware block computing $R^2$ mod N;
the custom logic hardware block computing RS mod N;
the custom logic hardware block transmitting $X=R^2$ mod N to the verifier;

the custom logic hardware block receiving a challenge input from the verifier;

the custom logic hardware block selecting Y=R or Y=RS mod N depending on the challenge input;

the custom logic hardware block transmitting the selected Y to the verifier; and the verifier confirming the identification number V based on a computation performed by the verifier using the received values X and Y.

24. The CAM of claim 19 wherein the hardware state machine in the custom logic hardware block is configured to use the hidden non-modifiable identification number and the other information to provide the output, wherein the output is a digital signature using the hidden non-modifiable information number as a secret signing key.

25. The CAM of claim 19 wherein the hardware state machine in the custom logic hardware block is configured to use the hidden non-modifiable identification number and the other information to provide the output, wherein the output is a symmetric or an asymmetric encryption using the hidden non-modifiable information number as a secret encryption key.

26. The CAM of claim 19 wherein the protected nonvolatile memory component is isolated such that a system input/output module, microprocessor, or external environment is prevented from direct access to the identification number.

27. The CAM of claim 19 wherein the hardware state machine in the custom logic hardware block comprises:

a random number generator configured to generate a random number;

a register configured to store the random number;

a first multiplier configured to perform a first modulus operation using the random number from the register;

a second multiplier configured to perform a second modulus operation using the random number from the register and the hidden non-modifiable identification number; and a multiplexer configured to multiplex results from the one or more multipliers to produce output.

* * * * *